United States Patent [19]

Mountz

[11] Patent Number: 4,491,201

[45] Date of Patent: Jan. 1, 1985

[54] TROLLEY

[75] Inventor: Craig E. Mountz, Wadsworth, Ill.

[73] Assignee: Ammco Tools, Inc., North Chicago, Ill.

[21] Appl. No.: 445,067

[22] Filed: Nov. 29, 1982

[51] Int. Cl.[3] .......................... B61H 7/00; B60S 13/00

[52] U.S. Cl. ...................................... 188/42; 188/174; 187/8.43

[58] Field of Search ................. 188/41, 174, 176, 177, 188/42; 16/44, 18 A; 280/43.24, 703; 267/63 A; 305/9; 187/8.41, 8.43, 8.45, 8.67, 8.74, 8.75, 8.47; 105/453; 254/90

[56] References Cited

U.S. PATENT DOCUMENTS

| | | | |
|---|---|---|---|
| 1,847,719 | 3/1932 | Hirschel | 187/8.43 |
| 2,076,027 | 4/1937 | Hott | 187/8.43 |
| 2,782,873 | 2/1957 | Smith | 188/41 |
| 3,048,237 | 8/1962 | Rutherford | 188/8.43 |
| 3,117,652 | 1/1964 | Wallace | 187/8.75 |
| 3,318,417 | 5/1967 | Royce | 187/8.67 |
| 3,365,026 | 1/1968 | Mancini | 187/8.43 |
| 3,563,345 | 2/1971 | MacMillan | 187/8.43 |
| 4,323,141 | 4/1982 | Ragan et al. | 187/8.47 |

FOREIGN PATENT DOCUMENTS

| | | | |
|---|---|---|---|
| 0386654 | 4/1965 | Sweden | 187/8.43 |

*Primary Examiner*—Bruce H. Stoner, Jr.
*Assistant Examiner*—Alvin Oberley
*Attorney, Agent, or Firm*—Edmond T. Patnaude

[57] ABSTRACT

A trolley assembly for use in an automobile lift rack employs individual trolley wheel mounts wherein the wheel is supported by a plurality of elastomeric mounts arranged in vertically displaced, mutual relationship to prevent bending of the mounts when the trolley assembly is loaded.

5 Claims, 6 Drawing Figures

TROLLEY

The present invention relates in general to trolley wheel assemblies, and it relates in particular to a new mount for elastomerically mounting a trolley wheel in a trolley and brake assembly such as used in automobile lift racks.

BACKGROUND OF THE INVENTION

Lift racks commonly include a carriage supported between two parallel track members on which the wheels of a vehicle are adapted to be supported. One or more jacks may be carried by the carriage which is mounted to the tracks by trolley assemblies which ride on track mounted rails to permit longitudinal movement of the carriage to the desired position beneath the vehicle located on the tracks.

In order to prevent the carriage from moving after the associated jack or jacks have been operated to support a part of the vehicle, brake means are incorporated into the trolley assembly. The brake means may incorporate braking surfaces which move downwardly against the trolley rails under the weight of the part of the vehicle supported by the carriage. The trolley wheels may be mounted to the carriage by means of elastomeric mounts which bend under the weight of the vehicle to permit the trolley wheels to retract so that the braking surfaces may descend into abutting relationship with the rails.

SUMMARY OF THE INVENTION

Briefly, there is provided in accordance with the present invention a new and improved brake type trolley wheel mount which employs a plurality of elastomeric mounts disposed in vertically displaced, mutual relationship so that the load on the trolley wheels exerts a shear stress rather than a bending stress on the mounts. Inasmuch as such mounts inherently resist shear stresses better than bending stresses, a lesser number of mounts are required for a given installation. Moreover, the lives of the mounts are extended.

In a preferred embodiment of the invention each trolley wheel is part of a subassembly which includes a rigid support bracket mounted to a jack carriage by three mutually offset elastomeric mounts. The jack carriage housing includes one or more downwardly facing brake surfaces which are forced against the trolley rail when the mounts are deflected in shear under the load of the vehicle resting on the jack carriage.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
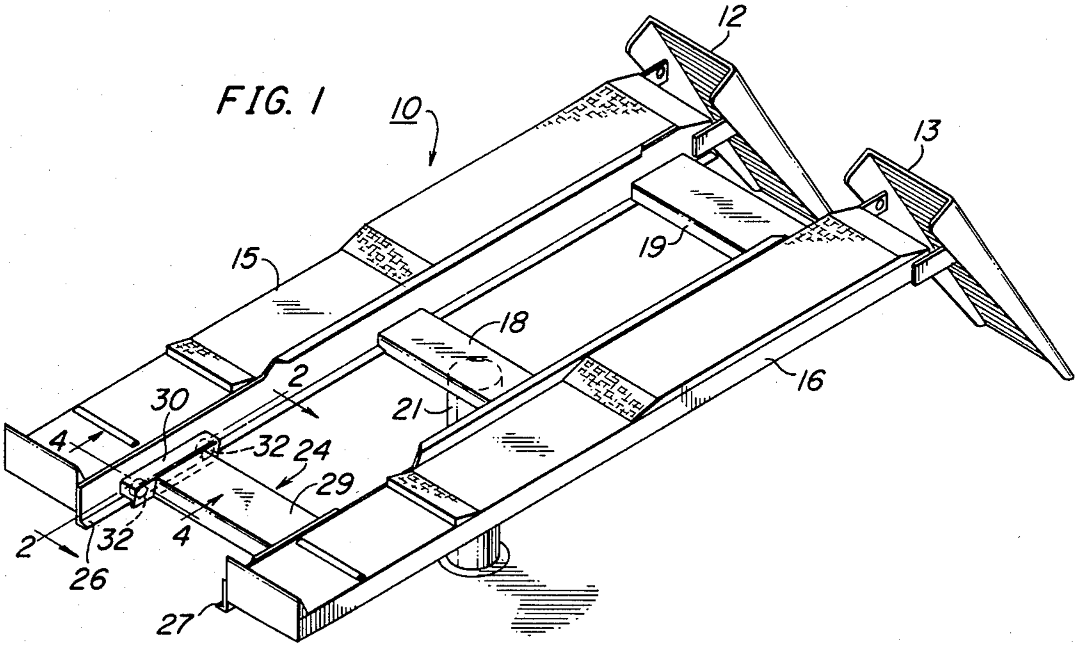
FIG. 1 is a perspective view of a hydraulic lift rack in which the present invention is embodied.

Referring particularly to FIG. 1, a lift rack is generally identified by the reference character 10 and is shown in a partially elevated condition. A pair of ramps 12 and 13 are pivotally mounted to respective ones of a pair of wheel support tracks 15 and 16 held in parallel, spaced-apart relationship by laterally extending cross-frames 18 and 19 fixedly connected at their ends to the tracks 15 and 16. The piston 21 of a fluid operated piston-cylinder motor (not visible in the drawings) mounted in the floor beneath the track assembly supports the rack.

In order to elevate a selected part of a vehicle located on the lift, there is provided a jack carriage 24 supported for longitudinal movement between the tracks 15 and 16 on a pair of rails 26 and 27. The carriage 24 includes the flat upper surface of a rigid cross-frame 29 on which one or more jacks (not shown) may be placed at selected strategic locations. If desired, the carriage 24 may include integral jack means in the manner described, for example, in U.S. Pat. No. 4,050,545.

In addition to the rigid cross-frame 29, the carriage 24 includes a pair of identical trolley housings 30 fixedly connected as by welding to the respective opposite ends of the cross-frame 29. Each of the housings 30 includes a pair of freely rotatable trolley wheels 32 which rest on the rails 26 as best shown, for example, in FIG. 4. As thus far described, it may be seen that the carriage 24 can be readily moved along the rails 26 to the desired position beneath a vehicle supported by its wheels on the tracks 15 and 16, and then the jack mechanism carried by the carriage can be actuated to engage a selected part of the vehicle and exert an upward, vertical force to the selected part.

Figure 4:
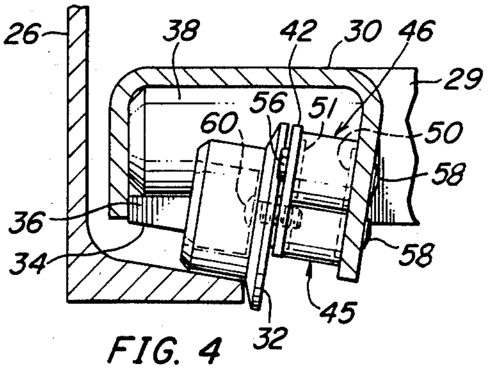
FIG. 4 is a cross-sectional view taken along the line 4—4 in FIG. 1 and showing a trolley wheel assembly in the unloaded condition.

In order to prevent the carriage 24 from moving along the rails 26 after the jacking mechanism has been operated to lift a portion of the vehicle, each of the housings 30 includes one or more downwardly facing friction braking surfaces 34 which are held in spaced relationship with the rails when the carriage 24 is unloaded, as shown in FIG. 4. When, however, the jack mechanism is operated to lift a vehicle located on the lift rack, the trolley wheels 32 are automatically retracted up into the housings 30 and the braking surfaces 34 descend onto the rails 26.

Figure 2:
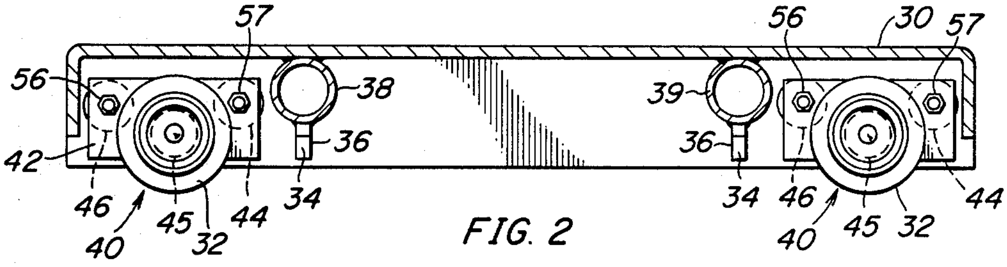
FIG. 2 is a cross-sectional view taken along the line 2—2 in FIG. 1.

As best shown in FIGS. 2 and 4, the braking surfaces 34 may be the bottom edges of a pair of triangular metal plates 36 depending from supporting pipes 38 and 39. The plates 36 are welded to the pipes 38 and 39 which are in turn welded to the housing 30.

Figure 6:
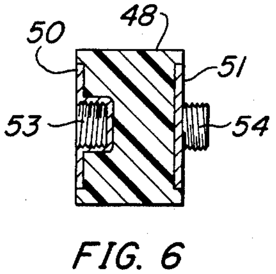
FIG. 6 is a cross-sectional view of elastomeric mounts used in each of the trolley wheel subassemblies of the present invention.

In accordance with an important aspect of the present invention, each trolley wheel 32 is part of a trolley wheel subassembly 40 which in addition to the trolley wheel 32 includes a rigid bracket plate 42 and three elastomeric mounts 44, 45 and 46. As best shown in FIG. 6, the mounts each includes an elastomeric body portion 48, preferably formed of solid rubber, having a pair of end plates 50 and 51 bonded to the respective ends thereof. A threaded recess 53 is provided in the plate 50 and a threaded stud 54 is affixed as by welding to the plate 51 in axial alignment with the recess 53. The studs 54 extend through holes in the bracket plate 42 and the outside mounts 44 and 46 are secured to the plate 42 by a pair of nuts 56 and 57. The trolley wheel 32 is positioned over a central hole in the bracket plate 42, and a screw 60 is tightly threaded onto the stud 54 of the central mount 45. The trolley wheel 32 and the three mounts 44, 45 and 46 are thus assembled to the plate 42 to provide the subassembly 40 which is then attached as a unit to the housing 30. The recesses 53 align with holes in the housing 30 and are held in place by a plurality of machine screws 58.

Figure 3:
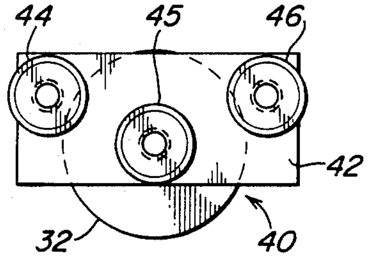
FIG. 3 is a side elevational view of a trolley wheel subassembly embodying the present invention.
Figure 5:
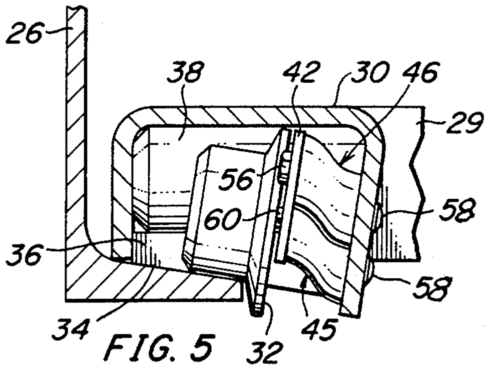
FIG. 5 is a cross-sectional view similar to that of FIG. 4 but showing a trolley wheel assembly in a loaded condition as when a vehicle is supported by the jack carriage.

As may best be seen in FIGS. 2 and 3, the mounts 45 is vertically offset from the mounts 44 and 46. As a consequence, as the carriage is loaded, the elastomeric portions 48 of the mounts 44, 45 and 46 are prevented from bending as would be the case if the three mounts were mutually aligned along a horizontal axis. The three mounts 44, 45 and 46 thus deflect in shear as shown in FIG. 5 to permit the trolley wheel to retract into the housing so that the brake surfaces 34 rest directly on the associated rail 26. Inasmuch as the mounts exhibit a substantially greater resistance to shear stresses than to bending stresses, a lesser number of mounts can be used to maintain an unloaded jack carriage in the position shown in FIG. 4 wherein the carriage rolls freely along the rails.

While the present invention has been described in connection with a particular embodiment thereof, it will be understood by those skilled in the art that many changes and modifications may be made without departing from the true spirit and scope of the present invention. Therefore, it intended by the appended claims to cover all such changes and modifications which come within the true spirit and scope of this invention.

What is claimed:

1. In a trolley assembly for movement along a rail, the combination comprising a frame, brake means carried by said frame for braking engagement with said rail, a trolley wheel support, a trolley wheel rotatably carried by said support, and at least three elastomeric mounts connecting said trolley wheel support to said frame with said wheel resting on said rail and said brake means spaced above said rail in disengaged relationship therewith, said elastomeric mounts each including an elastomeric member secured at one end to said support and secured at the end opposite said one end to said frame, at least two of said mounts being displaced vertically from one other of said mounts, whereby a downward force on said frame causes said mounts to move in shear and permit said brake means to engage said rail.

2. The combination according to claim 1 wherein said trolley wheel support is a plate, and said one other of said mounts is aligned with the axis of rotation of said trolley wheel.

3. The combination according to claim 2 wherein said plurality of mounts comprises two mounts vertically displaced from said one other of said mounts.

4. The combination according to claim 1 wherein said mounts each comprises an elastomeric part providing the sole connection between said support and said frame.

5. The combination according to claim 4 wherein said brake means is an edge surface of said frame.

* * * * *